(12) United States Patent
Chagny

(10) Patent No.: US 6,873,136 B2
(45) Date of Patent: Mar. 29, 2005

(54) SMART VRM TO EXTEND THE BATTERY LIFE

(75) Inventor: Marie-Pascale Chagny, Austin, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 10/462,982

(22) Filed: Jun. 17, 2003

(65) Prior Publication Data

US 2004/0257048 A1 Dec. 23, 2004

(51) Int. Cl.$^7$ .................................................. H02J 7/04
(52) U.S. Cl. ...................................... 320/141; 320/139
(58) Field of Search ............................... 320/141, 139, 320/137, 136, 134, 132, 129, 128, 145, 163; 323/282, 272; 324/426, 430

(56) References Cited

U.S. PATENT DOCUMENTS

| | | | |
|---|---|---|---|
| 6,118,676 A | * 9/2000 | Divan et al. | 363/34 |
| 6,448,672 B1 | 9/2002 | Voegeli et al. | 307/52 |
| 6,545,450 B1 | 4/2003 | Ledenev et al. | 323/272 |
| 6,559,684 B2 | 5/2003 | Goodfellow et al. | 327/52 |

OTHER PUBLICATIONS

Zhou, Xunwei et al.; *Investigation of Candidate VRM Topologies for Future Microprocessors*, IEEE Transactions on Power Electronics, vol. 15, No. 6, Nov. 2000.

\* cited by examiner

*Primary Examiner*—Michael Sherry
*Assistant Examiner*—Lawrence Luk
(74) *Attorney, Agent, or Firm*—Haynes and Boone, LLP

(57) ABSTRACT

In a method and system for generating a regulated direct current (DC) voltage output of a voltage regulator module (VRM) to power a device of the information handling system, an activity input, which is indicative of levels of activity of a processor included in the device, is received by the controller module. The controller module selects a first switching frequency from a plurality of switching frequencies of the VRM. The first switching frequency corresponds to a first level of activity. A charge switch is operable to receive a DC voltage input and generate a switched IDC voltage output having the first switching frequency. A discharge switch is operable to provide a discharge path for the switched DC voltage signal while the charge switch is open. A filter module is operable to filter the first switching frequency from the switched DC voltage output and generate the regulated DC voltage output.

20 Claims, 5 Drawing Sheets

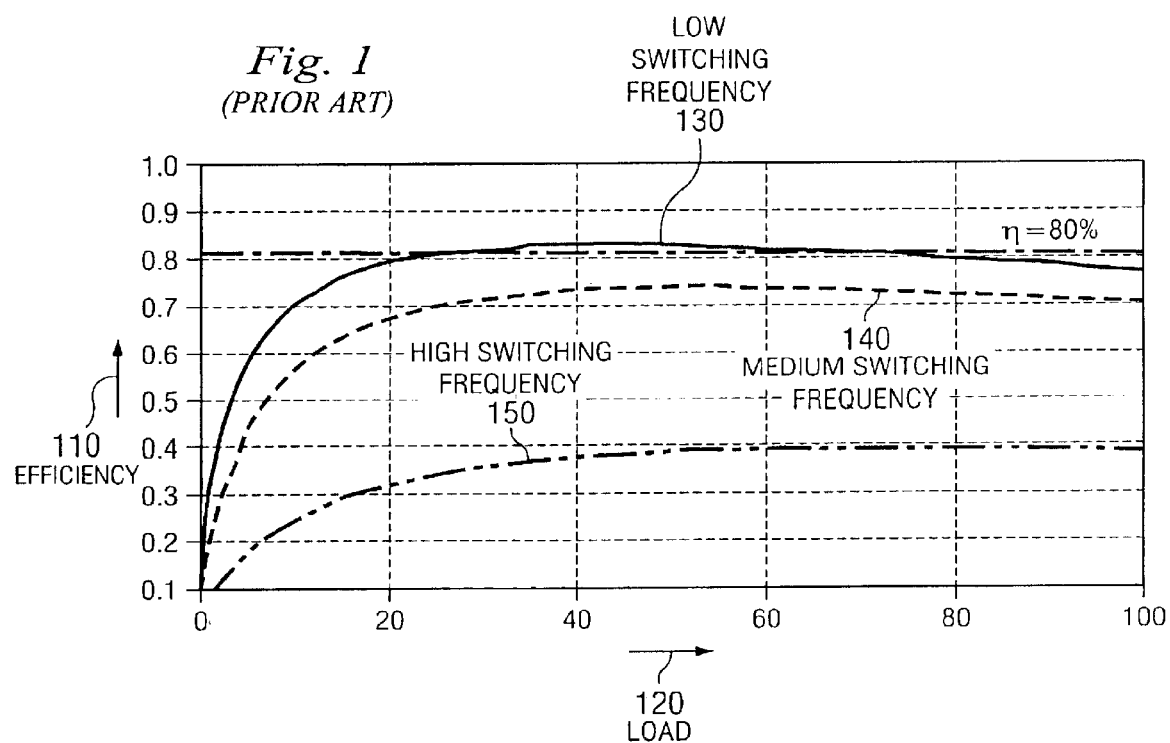

SMART VRM TO EXTEND THE BATTERY LIFE

BACKGROUND

The present disclosure relates generally to information handling systems, and more particularly to regulating voltages of a power source commonly used to provide power to information handling system components such as servers, desktop and notebook computers, storage systems, personal digital assistants, cellular phones and gaming consoles.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Typically, information handling systems are powered by a power supply system, which include an alternating current (AC) to direct current (DC) adaptor. The AC/DC adaptor receives an AC input and generates a DC output. The DC output is used to provide power to the information handling system components such as a processor, memory, and rechargeable batteries. Since each of the system components may have unique voltage and power requirements, a conversion of the DC output is often required. Thus, the power supply system may also include a DCDC converter for converting the DC output voltage level to multiple predefined lower is DC voltage levels typically required by various components and/or sub-systems, including the processor.

Use of a voltage regulator module (VRM) in a DC-DC converter to deliver specified lower voltage levels is well known. The VRM may take many forms including a "buck converter". The buck converter typically "chops" the DC input voltage to a square wave of a defined frequency. The square wave has an average voltage equal to the required output voltage. A filter component typically filters the square wave to remove the alternating component, leaving the desired lower voltage. The frequency of operation of the buck converter is referred to as the "switching frequency". A controller portion of the VRM responds to changes in load impedance, which may cause a disturbance in the output voltage unless corrected. A majority of the traditional VRM's used in portable devices are based on a fixed switching frequency, usually 300 kHz.

Power consumed by the processors is increasing from one technology generation to the next. The supply voltage required by the processors is also decreasing and is anticipated to fall below 1 Volt. The combination of lower voltages and higher currents make voltage regulation a more challenging task. In a technical paper entitled, "Investigation of Candidate VRM Topologies for Future Microprocessors", IEEE Transactions on Power Electronics, November 2000, pages 1172–1182, Xunwei Zhou et al., and incorporated herein by reference, the paper describes a VRM topology for controlling supply voltages required by future processors.

In general terms, it is desirable for the VRM to have a high efficiency, a good transient response to changes in the load impedance and small voltage ripples. According to the above referenced technical paper, the power supply voltage ripples may be reduced by increasing the switching frequency of the field effect transistor (FET) switches used in the VRM to create the square waveform. FIG. 1 illustrates a graph of efficiency 110 versus load 120 for a low 130, medium 140 and a high 150 switching frequency of a VRM. As shown in the graph, by increasing the VRM switching frequency from the low 130 (300 kHz) to the medium 140 (1 MHz) to the high 150 (10 MHz) frequency, the corresponding efficiency reduces from approximately 80% to 73% to 40% respectively. The reduction in efficiency caused by a higher switching frequency reduces battery life and/or increases heating and power consumption.

Therefore, a need exists to develop techniques for improving the efficiency of the VRM used to provide energy to information handling system components. More specifically, a need exist to develop tools and techniques for improving the efficiency of the VRM used in a portable device that is more flexible and dynamic than such systems and methods heretofore available. Accordingly, it would be desirable to provide tools and techniques for improving the efficiency of the power conversion devices included in an information handling system absent the disadvantages found in the prior methods discussed above.

SUMMARY

The foregoing need is addressed by the teachings of the present disclosure, which relates to a system and method for improving the efficiency of a VRM used to provide power to portable information handling system devices. According to one embodiment, in a system for generating a regulated DC voltage output of the VRM to power a device of the information handling system, an activity input, which is indicative of levels of activity of a processor included in the device, is received by the controller module. The controller module selects a first switching frequency from a plurality of switching frequencies of the VRM. The first switching frequency corresponds to a first level of activity. A charge switch is operable to receive a DC voltage input and generate a switched DC voltage output having the first switching frequency. A discharge switch is operable to provide a discharge path for the switched DC voltage signal while the charge switch is open. A filter module is operable to filter the first switching frequency from the switched DC voltage output and generate the regulated DC voltage output. To improve efficiency, the VRM advantageously changes the switching frequency of the VRM in accordance with the activity of the processor.

In one embodiment, a method for generating the regulated DC voltage output of the VRM receiving the activity input 202 indicative of levels of activity of the processor. A first switching frequency is selected from a plurality of switching frequencies of the VRM. The first switching frequency corresponds to a first level of activity of the processor. The DC voltage input is received from an AC/DC adapter for conversion. A switched DC voltage output having the first switching frequency is generated upon receiving the DC voltage input. The first switching frequency is filtered from the switched DC voltage output to generate the regulated DC voltage output.

Several advantages are achieved by the method and system according to the illustrative embodiments presented herein. The embodiments advantageously provide for improving the VRM efficiency.

BRIEF DESCRIPTION OF THE DRAWINGS

FIG. 1 (PRIOR ART), described hereinabove, illustrates a graph of efficiency versus load for a low, medium and a high switching frequency of a VRM;

DETAILED DESCRIPTION

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various devices or components described herein may be implemented as hardware (including circuits) and/or software, depending on the application requirements.

As described earlier, a traditional approach to reduce voltage ripple is to increase the switching frequency of the field effect transistor (FET) switches used in the VRM to create the square waveform. However, the efficiency of the VRM is reduced by increasing the switching frequency. There is a need for improving the efficiency of the VRM while reducing the voltage ripple. According to one embodiment, an improved VRM dynamically changes the switching frequency of the VRM in accordance with the activity of the processor.

Figure 2A:
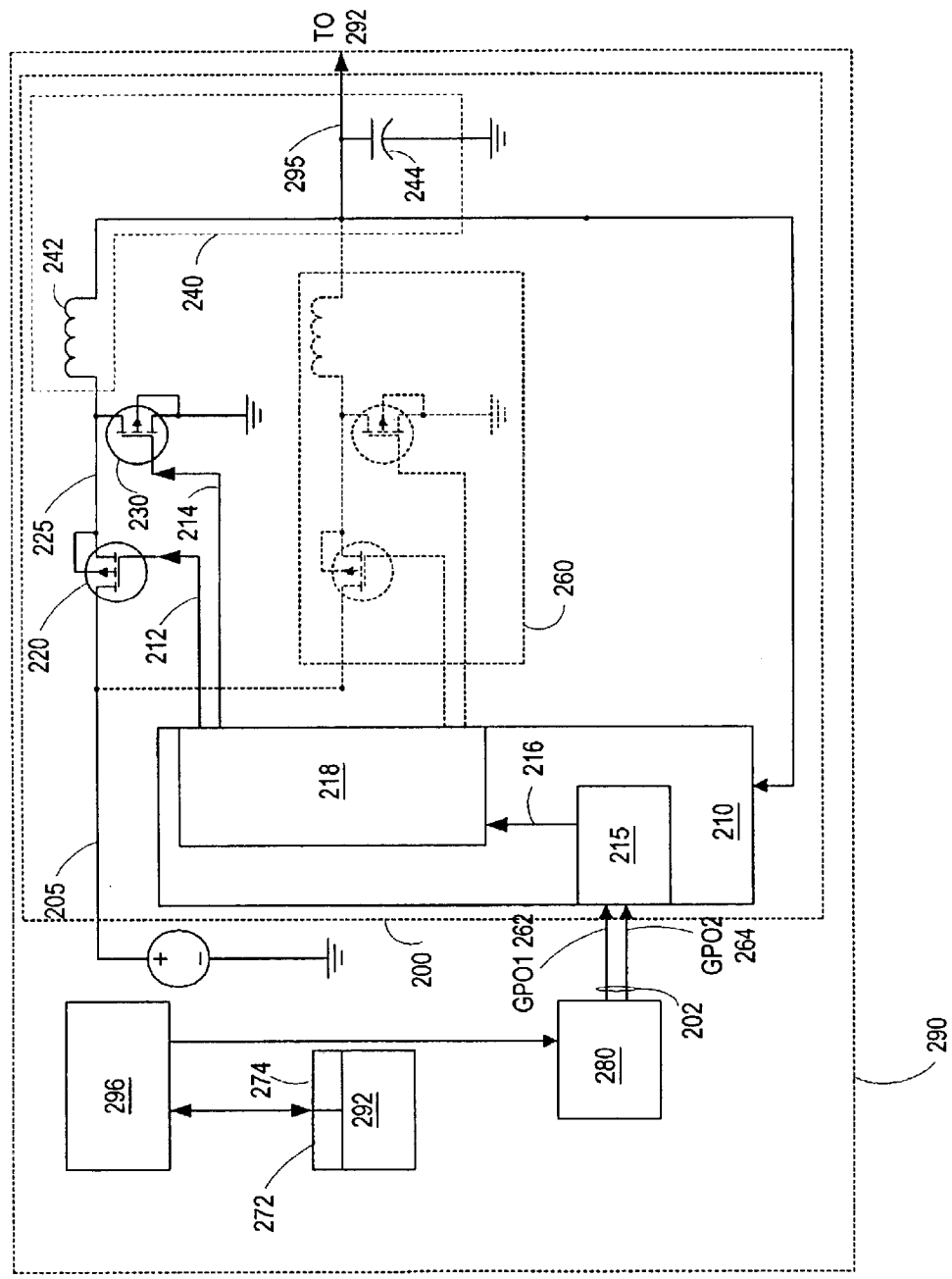
FIG. 2A illustrates a diagrammatic representation of a VRM having a selectable switching frequency, according to an embodiment.

FIG. 2A illustrates a diagrammatic representation of a VRM 200 having a selectable switching frequency, according to an embodiment. The VRM 200 is operable to receive a direct current (DC) voltage input 205 and generate a regulated DC voltage output 295. In one embodiment, the regulated DC voltage output 295 provides power to a processor 292 included in an information handling system device 290. The output 295 may also be used to power other components (not shown) included in the device 290. The VRM 200 for generating the regulated DC voltage output 295 includes:

a) a controller module 210 operable to receive an activity input 202 indicative of levels of activity of the processor 292, b) a charge switch 220 operable to receive the DC voltage input 205 and generate a switched DC voltage output 225 in response to receiving a charge control signal 212 from the controller module 210, c) a discharge switch 230 electrically coupled to the controller module 210 and the charge switch 220, the controller module 210 generating a discharge control signal 214 to provide a discharge path for the switched DC voltage 225 while the charge switch 220 is open, and d) a filter module 240 electrically coupled to the charge switch 220 and the discharge switch 230, the filter module 240 filtering alternating current (AC) components from the switched DC voltage output 225 and generating the regulated DC voltage output 295.

Use of 2-phase or 3-phase VRM's is well known to reduce the voltage ripple. The VRM 200 is shown to include a single phase but may optionally include additional phases such as a second-phase 260.

The processor 292 loading, usage or activity level will vary depending on the number of instructions executed within a predefined time interval. The processor 292 is described to be 100% or fully loaded if it is executing the maximum number of is instructions per specification within the predefined time interval. In one embodiment, the activity level (not shown) of the processor 292 may be grouped. into 3 levels as follows: a) a high activity level when the processor 292 loading is equal to or greater than 80% of the maximum, b) a medium activity level when the processor 292 loading is greater than 30% but less than 80% of the maximum, and c) a low activity level when the processor 292 loading is less than or equal to 30% of the maximum. Thus any loading value for the processor 292 may be grouped under the high, the medium or the low activity level. In alternative embodiments, the number of groups and the range definition criteria within each group may vary.

In one embodiment, a software program 296, which may be included in the operating system (not shown) of the device 290, monitors the processor 292 loading. The software program 296 may utilize predictive techniques to forecast the processor 292 loading by analyzing the processor instruction pipeline stack. Based on the processor 292 loading and/or the forecasted values, the software program 296 generates the activity input 202 indicative of levels of activity of the processor 292. The activity input 202 may be updated on a periodic basis, e.g., once every millisecond, on an event basis or on an on-demand basis.

In one embodiment, the activity input 202 includes 2 bits, defined as General Purpose Output bits GPO1 262 and GPO2 264. The 2 bits are used to define up to 4 activity levels of the processor 292. In alternative embodiments, additional bits may be used to defined more than 4 activity levels of the processor 292. For example, in the 2 bit embodiment, the low level of activity may be defined by setting GPO1 262 and GPO2 264 bits to 0 and 0 respectively. Similarly, the medium level of activity may be defined by setting GPO1 262 and GPO2 264 bits to 1 and 0 respectively and the high level of activity may be defined by setting GPO1 262 and GPO2 264 bits to 1 and 1 respectively. As the activity level of the processor 292 changes, the value of each bit also changes dynamically. In one embodiment, the GPO1 262 and GPO2 264 bits may be stored in an I/O controller hub (ICH) 280 included in the device 290.

The controller module 210 includes a frequency selector module 215 and a FET driver module 218. The controller module 210 receives the regulated DC voltage output 295 as a feedback input for regulating the output of the VRM 200. The frequency selector module 215 is operable to receive the activity input 202. e.g., GPO1 262 and GPO2 264, and select a switching frequency 216 from a plurality of switching frequencies as an output, which dynamically matches the level of activity of the processor 292. In one embodiment, the plurality of switching frequencies exactly corresponds to the levels of activity of the processor 292. For example, in the embodiment having low, medium and high activity levels there are 3 corresponding low 130, medium 140 and high 150 switching frequencies.

Thus the controller module 210 dynamically changes the switching frequency 216 of the VRM 200 responsive to the activity input 202 indicative of the activity level of the processor 292. When the activity of the processor 292 is high, the switching frequency 216 is selected to be high 150 to advantageously limit the voltage ripples and maintain the regulated DC voltage output 295 above its specified minimum value. When the activity of the processor 292 is low, the switching frequency 216 is selected to be low 130 to save power. In this case, the voltage ripples may be higher as the voltage required by the processor 292 tends to stay in the middle of its operating range. The selection of the low 130 frequency value for the switching frequency 216 advantageously improves the VRM 200 efficiency, as shown in FIG. 1. The exemplary values for the multiple VRM switching frequencies, e.g., the low 130 (300 kHz), the medium 140 (1 MHz) and the high 150 (10 MHz) frequency are based on present technology. The specific values may change as the technology changes.

The FET driver module 218 is operable to receive the selected value of the switching frequency 216 and generate the charge and discharge control signals 212 and 214, each having the switching frequency 216.

The DC voltage input 205 is generated by an AC/DC adapter (not shown) included in a power supply system (not shown), which provides power to the device 290. During a charge cycle the charge switch 220 is closed and the discharge switch 230 is open. During a discharge cycle the charge switch 220 is open and the discharge switch 230 is closed. The opening and closing of the charge and discharge switches 220 and 230 is controlled by the charge and discharge control signals 212 and 214 respectively. The DC voltage input 205 is "chopped" by the charge switch 220 to generate the switched DC voltage output 225. The switched DC voltage output 225 may be a square wave having the switching frequency 216. The square wave, which has several AC components, has an average voltage equal to the required output voltage.

In one embodiment, the filter module 240 includes an inductance L 242 and a capacitor C 244. The filter module 240 filters the switching frequency 216 from the switched DC voltage output 225 and generates the regulated DC voltage output 295. The inductance L 242 and capacitor 244 values may be selected based a particular value of the switching frequency 216, e.g., low 130, medium 140 or high 150 frequency. If the device 290 is anticipated to operate mostly at a low activity level then the component values may be selected for the low 130 frequency.

In one embodiment, in addition to the GPO1 262 and GPO2 264 bits stored in the ICH 280, the software program 296 defines UREG_B1 272 and UREG_B2 274, which are 2 bits in a register of the processor 292 to control the maximum number of instructions executed per clock cycle. The demand for power required by the processor 292 is advantageously controlled by limiting the number of instructions executed for a predefined time period. This control mechanism ensures that the VRM 200 reacts responsively and on time according to the processor 292 demand. Additional details of the method to control the VRM 200 in response to changes in the projected loading of the processor 292 is described in FIG. 2B.

The UREG_B1 272 and UREG_B2 274 bits are used to define up to 4 activity levels of the processor 292. For example, the low level of activity may be defined by setting UREG_B1 272 and UREG_B2 274 bits to 0 and 0 respectively. Similarly, the medium level of activity may be defined by setting UREG_B1 272 and UREG_B2 274 bits to 1 and 0 respectively and the high level of activity may be defined by setting UREG_B1 272 and UREG_B2 274 bits to 1 and 1 respectively. As the activity level of the processor 292 changes, the value of each bit also changes dynamically.

Figure 2B:
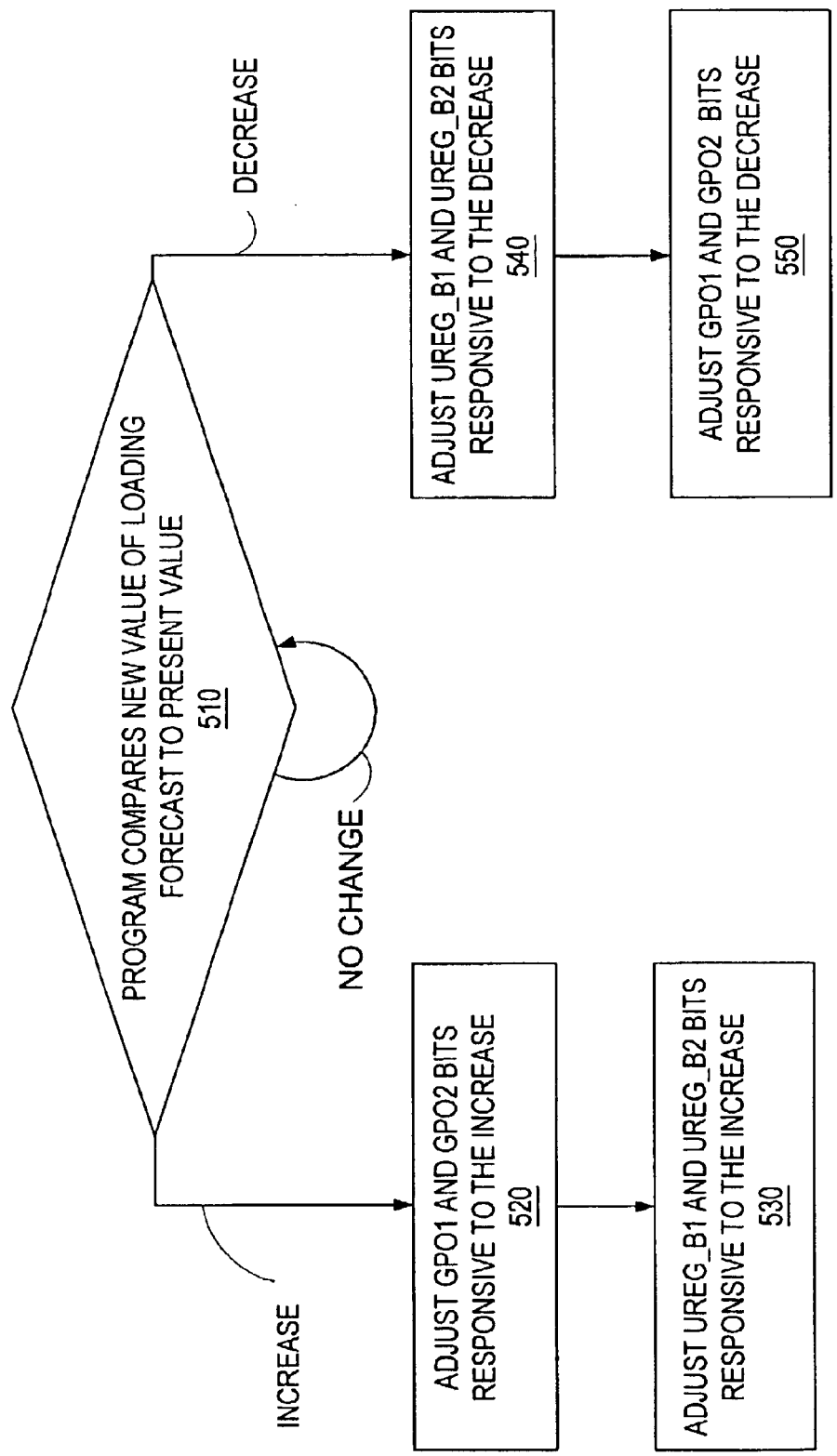
FIG. 2B is a flow chart illustrating an embodiment of a method for controlling a VRM in response to a change in projected loading of a processor.

FIG. 2B is a flow chart illustrating a method for controlling the VRM 200 in response to changes in the projected loading of the processor 292. In step 510 the software program 296 generates a new value for the loading forecast and compares the new value for the loading forecast with the present value of the loading forecast to determine if the new value has increased, decreased or is unchanged.

In step 520, if the new value for the loading forecast has been determined to be increased in the earlier step then the switching frequency 216 is increased by adjusting GPO1 262 and GPO2 264 bits. In step 530, the UREG_B1 272 and UREG_B2 274 are adjusted to allow an increased number of instructions executed per clock cycle.

In step 540, if the new value for the loading forecast has been determined to be decreased in the earlier step then the UREG_B1 272 and UREG_B2 274 are adjusted to allow a decreased number of instructions. In step 550, the switching frequency 216 is decreased by adjusting GPO1 262 and GPO2 264 bits.

This method advantageously adapts the switching frequency 216 and the throughput of the processor 292 to changing forecasts of the loading of the processor 292.

Figure 3:
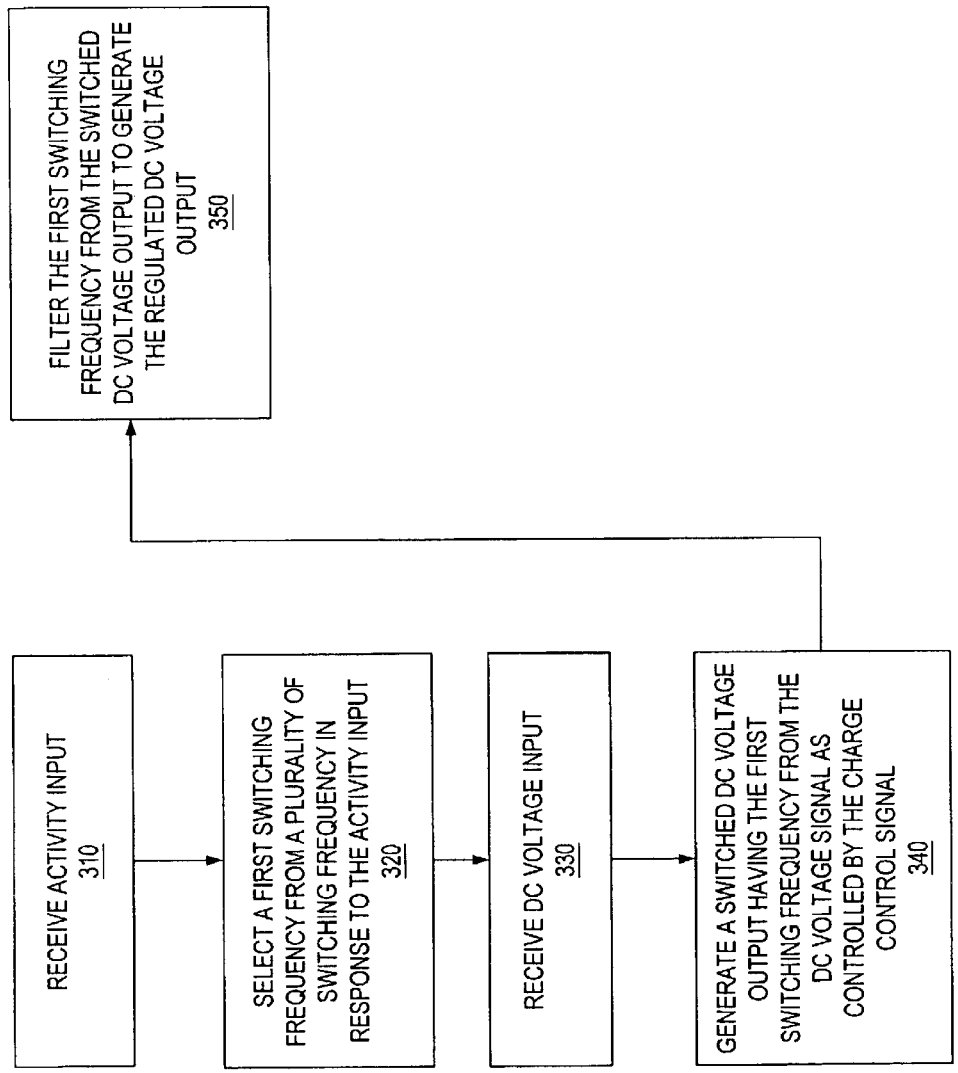
FIG. 3 is a flow chart illustrating a method for generating a regulated DC voltage output of a VRM, according to an embodiment.

FIG. 3 is a flow chart illustrating a method for generating the regulated direct current (DC) voltage output 295 of the VRM 200 to power the device 290. In step 310, the activity input 202 indicative of levels of activity of the processor 292 is received. The activity input 202 includes specific values for the GPO1 262 and GPO2 264 bits. In step 320, the controller module 210 selects a first switching frequency from a plurality of switching frequencies of the VRM 200. The first switching frequency corresponds to a first level of activity, e.g., the low 130 frequency corresponding to the low activity level of the processor 292. In step 330, the DC voltage input 205 is received. In step 340, the charge control switch 220 generates the switched DC voltage output 225 having the first switching frequency 216 in response to the charge control signal 212. In step 350, the filtering module 240 filters the first switching frequency from the switched DC voltage output 225 to generate the regulated DC voltage output 295.

Steps 310, 320, 330, 340 and 350 are repeated to process new values for GPO1 262 and GPO2 264 bits received as the activity input 202. Various steps described above may be added, omitted, combined, altered, or performed in different orders. For example, steps 310 and 330 may be performed in parallel rather than sequential.

Figure 4:
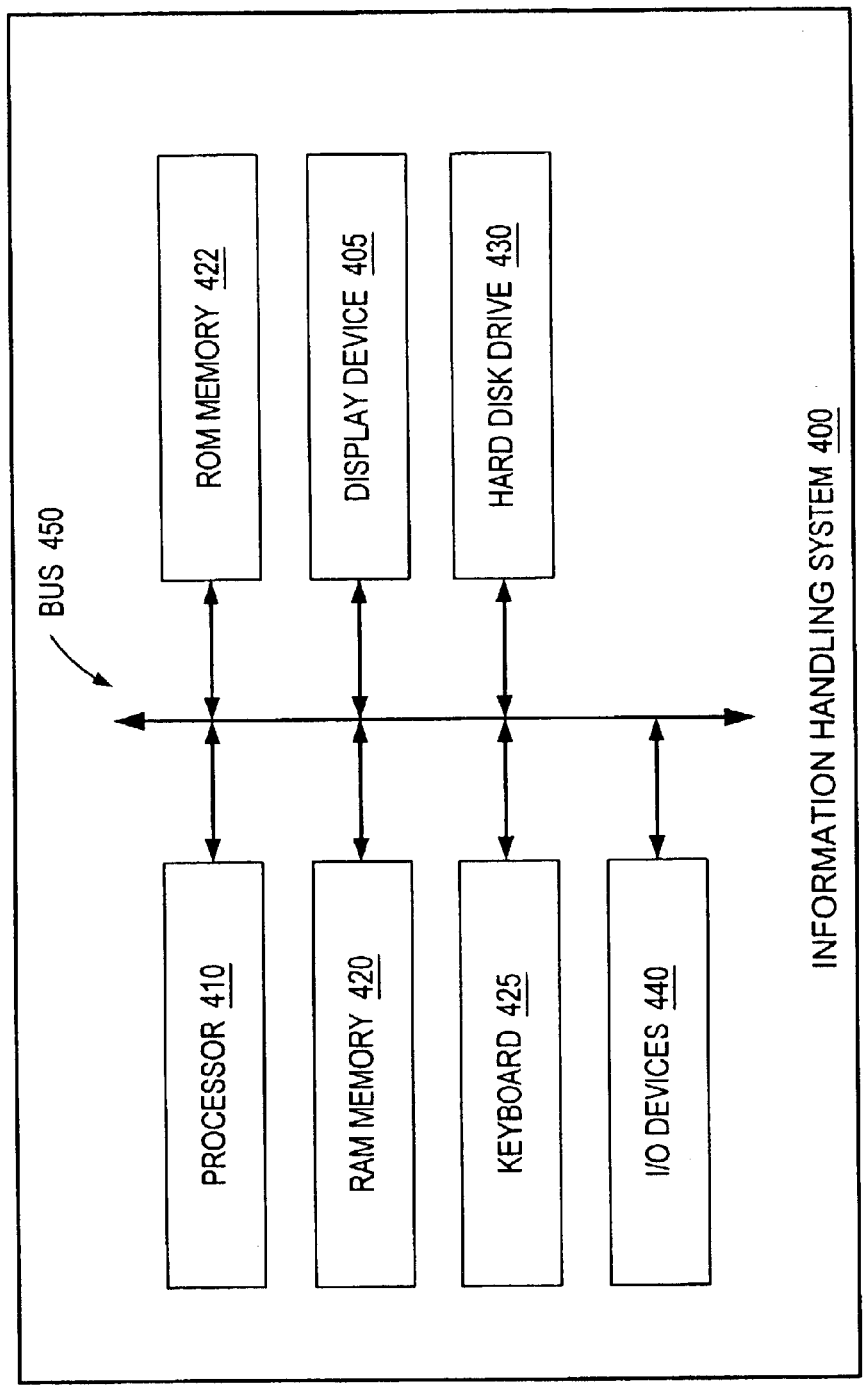
FIG. 4 illustrates a block diagram of an information handling system to implement method or apparatus aspects of the present disclosure, according to an embodiment.

FIG. 4 illustrates a block diagram of an information handling system to implement method or apparatus aspects of the present disclosure, according to an embodiment. For purposes of this disclosure, an information handling system 400 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the information handling system 400 may be a personal computer, a network, storage device, or any other suitable device and may vary in size, shape, performance, functionality, and price.

The information handling system 400 may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring to FIG. 4, the information handling system 400 includes a processor 410, a system random access memory (RAM) 420, a system ROM 422, a display device 405, a keyboard 425 and various other input/output devices 440. It should be understood that the term "information handling system" is intended to encompass any device having a processor that executes instructions from a memory medium. The information handling system 400 is shown to include a hard disk drive 430 connected to the processor 410 although some embodiments may not include the hard disk drive 430. The processor 410 communicates with the system components via a bus 450, which includes data, address and control lines. A communications device (not shown) may also be connected to the bus 450 to enable information exchange between the system 400 and other devices.

In one embodiment, the information handling system 400 may be used to implement the portable information handling system device 290 described in FIG. 2A. In this embodiment, the processor 292 is the same as the processor 410.

The processor 410 is operable to execute the computing instructions and/or operations of the information handling system 400. The memory medium, e.g., RAM 420, preferably stores instructions (also known as a "software program") for implementing various embodiments of a method in accordance with the present disclosure. In various embodiments the one or more software programs are implemented in various ways, including procedure-based techniques, component-based techniques, and/or object-oriented techniques, among others. Specific examples include assembler, C, XML, C++ objects, Java and Microsoft Foundation Classes (MFC). For example, in one embodiment, at least a portion of the software program 296 may be implemented using an assembler language code.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. In an information handling system, a method for generating a regulated direct current (DC) voltage output of a voltage regulator module (VRM) to power a device of the information handling system, the method comprising:

receiving an activity input indicative of levels of activity of a processor included in the device;

selecting a first switching frequency from a plurality of switching frequencies of the VRM, the first switching frequency corresponding to a first level of activity;

receiving a DC voltage input;

generating a switched DC voltage output having the first switching frequency; and filtering the first switching frequency from the switched DC voltage output to generate the regulated DC voltage output, wherein the first level of activity corresponds to a processor usage level of less than or equal to 30% of a maximum value, and wherein the first switching frequency is approximately 300 kilohertz.

2. The method of claim 1, comprising:

selecting a second switching frequency from the plurality of switching frequencies, the second switching frequency corresponding to a second level of activity;

generating the switched DC voltage output having the second switching frequency; and filtering the second switching frequency from the switched DC voltage output to generate the regulated voltage output.

3. The method of claim 2, wherein the second level of activity corresponds to a processor usage level of greater than or equal to 80% of a maximum value, wherein the second switching frequency is approximately 10 megahertz.

4. The method of claim 2, comprising:

selecting a third switching frequency from the plurality of switching frequencies, the second switching frequency corresponding to a third level of activity;

generating the switched DC voltage output having the third switching frequency; and filtering the third switching frequency from the switched DC voltage output to generate the regulated voltage output.

5. The method of claim 4, wherein the third level of activity corresponds to a processor usage level between a range greater than 30% and less than 80% of a maximum value, wherein the third switching frequency is approximately 1 megahertz.

6. The method of claim 1, wherein each switching frequency selected corresponds to a level of activity included in the levels of activity.

7. The method of claim 1, wherein the activity input includes at least 2 bits to describe up to 4 levels of activity.

8. The method of claim 7, wherein the at least 2 bits are defined by a software program monitoring usage of the processor.

9. The method of claim 1, wherein the software program limits instructions processed by the processor by defining at least 2 bits of a register of the processor.

10. A voltage regulator module (VRM) operable to receive a direct current (DC) voltage input and generate a regulated DC voltage output, the output being provided to an information handling system device. the VRM comprising:

a controller module operable to receive an activity input indicative of levels of activity of a processor included in the device, the controller module selecting a first switching frequency from a plurality of switching frequencies, the first switching frequency corresponding to a first level of activity included in the levels of activity;

a charge switch electrically coupled to the controller module, the charge switch being operable to receive the DC voltage input and generate a switched DC voltage output having the first switching frequency;

a discharge switch electrically coupled to the controller module and the charge switch, the discharge switch being operable to provide a discharge path for the switched DC voltage signal while the charge switch is open;

a filter module electrically coupled to the charge switch and the discharge switch, the filter module being operable to filter the first switching frequency from the switched DC voltage output and generate the regulated DC voltage output, wherein the regulated DC voltage output is provided as a feedback input to the controller module for regulation; and wherein the first level of activity corresponds to a processor usage level of less than or equal to 30% of a maximum value, the first switching frequency being approximately 300 kilohertz.

11. The VRM of claim 10, wherein the controller module selects a second switching frequency from the plurality of switching frequencies, the second switching frequency corresponding to a second level of activity, wherein the charge switch is operable to generate the switched DC voltage output having the second switching frequency, and wherein the filter module is operable to filter the second switching frequency from the switched DC voltage output to generate the regulated DC voltage output.

12. The VRM of claim 11, wherein the second level of activity corresponds to a processor usage level of greater than or equal to 80% of a maximum value, wherein the second switching frequency is approximately 10 megahertz.

13. The VRM of claim 10, wherein each switching frequency selected by the controller module from the plurality of switching frequencies corresponds to a level of activity included in the levels of activity.

14. The VRM of claim 10, wherein the controller module selects a third switching frequency from the plurality of switching frequencies, the third switching frequency corresponding to a third level of activity, wherein the charge switch is operable to generate the switched DC voltage output having the third switching frequency, and wherein the filter module is operable to filter the third switching frequency from the switched DC voltage output to generate the regulated DC voltage output.

15. The VRM of claim 14, wherein the third level of activity corresponds to a processor usage level between a range greater than 30% and less than 80% of a maximum value, wherein the third switching frequency is approximately 1 megahertz.

16. The VRM of claim 10, wherein the activity input includes at least 2 bits to describe up to 4 levels of activity.

17. An information handling system comprising:
a processor;
a system bus;
a memory coupled to the processor through the system bus; and
a power supply system operable to provide power to the processor, the bus and the memory, the power supply system being connectable to an AC adapter for deriving power from an AC power source;
wherein the power supply system includes:
a voltage regulator module (VRM) operable to receive a direct current (DC) voltage input and generate a regulated DC voltage output, the output being provided to the processor, the VRM including:
a controller module operable to receive an activity input indicative of levels of activity of a processor included in the device, the controller module selecting a first switching frequency from a plurality of switching frequencies, the first switching frequency corresponding to a first level of activity included in the levels of activity;
a charge switch electrically coupled to the controller module, the charge switch being operable to receive the DC voltage input and generate a switched DC voltage output having the first switching frequency;
a discharge switch electrically coupled to the controller module and the charge switch, the discharge switch being operable to provide a discharge path for the switched DC voltage signal while the charge switch is open; and
a filter module electrically coupled to the charge switch and the discharge switch, the filter module being operable to filter the first switching frequency from the switched DC voltage output to generate the regulated DC voltage output, wherein the regulated DC voltage output is provided as a feedback input to the controller module for regulation; and wherein the first level of activity corresponds to a processor usage level of less than or equal to 30% of a maximum value, wherein the first switching frequency being approximately 300 kilohertz.

18. In an information handling system, a method for generating a regulated direct current (DC) voltage output of a voltage regulator module (VRM) to power a device of the information handling system, the method comprising:
receiving an activity input indicative of levels of activity of a processor included in the device;
selecting a first switching frequency from a plurality of switching frequencies of the VRM, the first switching frequency corresponding to a first level of activity;
receiving a DC voltage input;
generating a switched DC voltage output having the first switching frequency;
filtering the first switching frequency from the switched DC voltage output to generate the regulated DC voltage output;
selecting a second switching frequency from the plurality of switching frequencies, the second switching frequency corresponding to a second level of activity;
generating the switched DC voltage output having the second switching frequency;
filtering the second switching frequency from the switched DC voltage output to generate the regulated voltage output;
selecting a third switching frequency from the plurality of switching frequencies, the second switching frequency corresponding to a third level of activity:
generating the switched DC voltage output having the third switching frequency; and
filtering the third switching frequency from the switched DC voltage output to generate the regulated voltage output.

19. In an information handling system, a method for generating a regulated direct current (DC) voltage output of a voltage regulator module (VRM) to power a device of the information handling system, the method comprising:
receiving an activity input indicative of levels of activity of a processor included in the device;
selecting a first switching frequency from a plurality of switching frequencies of the VRM, the first switching frequency corresponding to a first level of activity;
receiving a DC voltage input;
generating a switched DC voltage output having the first switching frequency; and
filtering the first switching frequency from the switched DC voltage output to generate the regulated DC voltage output, wherein the activity input includes at least 2 bits to describe up to 4 levels of activity.

20. In an information handling system, a method for generating a regulated direct current (DC) voltage output of a voltage regulator module (VRM) to power a device of the information handling system, the method comprising:

receiving an activity input indicative of levels of activity of a processor included in the device;

selecting a first switching frequency from a plurality of switching frequencies of the VRM, the first switching frequency corresponding to a first level of activity;

receiving a DC voltage input;

generating a switched DC voltage output having the first switching frequency; and filtering the first switching frequency from the switched DC voltage output to generate the regulated DC voltage output, wherein the software program limits instructions processed by the processor by defining at least 2 bits of a register of the processor.

* * * * *